United States Patent
Yang

(10) Patent No.: US 11,317,376 B2
(45) Date of Patent: Apr. 26, 2022

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 63 days.

(21) Appl. No.: 16/764,744

(22) PCT Filed: Nov. 15, 2017

(86) PCT No.: PCT/CN2017/111160
§ 371 (c)(1),
(2) Date: May 15, 2020

(87) PCT Pub. No.: WO2019/095160
PCT Pub. Date: May 23, 2019

(65) Prior Publication Data
US 2021/0185641 A1    Jun. 17, 2021

(51) Int. Cl.
*H04W 72/00* (2009.01)
*H04W 76/27* (2018.01)
*H04W 72/04* (2009.01)

(52) U.S. Cl.
CPC ....... *H04W 72/005* (2013.01); *H04W 72/042* (2013.01); *H04W 72/0453* (2013.01); *H04W 76/27* (2018.02)

(58) Field of Classification Search
CPC ............. H04W 72/005; H04W 72/042; H04W 72/0453; H04W 72/0413; H04W 76/27;
(Continued)

(56) References Cited

U.S. PATENT DOCUMENTS

2009/0161613 A1   6/2009 Kent et al.
2010/0214937 A1   8/2010 Chen et al.
(Continued)

FOREIGN PATENT DOCUMENTS

CN    101516140    8/2009
CN    102668673    9/2012
(Continued)

OTHER PUBLICATIONS

Vivo, "Discussion on the activation/deactivation of the bandwidth part", 3GPP TSG RAN WG1 Meeting#90, R1-1712870, Aug. 21-25, 2017, pp. 1-3 (Year: 2017).*
(Continued)

*Primary Examiner* — Farid Seyedvosoghi
(74) *Attorney, Agent, or Firm* — Hodgson Russ LLP

(57) ABSTRACT

Disclosed are a data transmission method, a terminal device, and a network device. The method comprises: a terminal device receiving a system information block SIB1 broadcast by a network device, wherein the SIB1 comprises frequency point information of an uplink carrier; and the terminal device determining, according to the frequency point information of the uplink carrier, an uplink bandwidth part (BWP) associated with a downlink BWP for broadcasting the SIB1.

4 Claims, 4 Drawing Sheets

300

The terminal device receives radio resource control RRC signaling transmitted by a network device, where the RRC signaling includes information on at least one uplink bandwidth part BWP and at least one downlink BWP — S310

The terminal device receives a correspondence transmitted by the network device, where the correspondence is an association between the at least one uplink BWP and the at least one downlink BWP — S320

(58) Field of Classification Search
CPC ...... H04W 48/12; H04W 48/10; H04L 5/001; H04L 5/0053; H04L 5/0098
See application file for complete search history.

(56) References Cited

U.S. PATENT DOCUMENTS

| | | | |
|---|---|---|---|
| 2012/0014330 | A1 | 1/2012 | Damnjanovic et al. |
| 2013/0010619 | A1 | 1/2013 | Fong et al. |
| 2017/0195099 | A1 | 7/2017 | Kahtava et al. |
| 2019/0044811 | A1* | 2/2019 | Miao ............... H04L 41/0896 |
| 2019/0045549 | A1* | 2/2019 | Wu .................. H04W 72/085 |
| 2019/0364602 | A1* | 11/2019 | Yi ................... H04W 72/1278 |
| 2020/0280984 | A1* | 9/2020 | Yi ................... H04W 72/0453 |

FOREIGN PATENT DOCUMENTS

| | | |
|---|---|---|
| CN | 103825670 | 5/2014 |
| CN | 106612547 | 5/2017 |
| WO | 2014139303 | 9/2014 |
| WO | 2019097104 | 5/2019 |

OTHER PUBLICATIONS

Intel Corporation, "Remaining details for bandwidth parts," 3GPP TSG RAN WG1 Meeting 90bis, R1-1717400, Oct. 2017, 4 pages.
WIPO, ISR for PCT/CN2017/111160, Aug. 2, 2018.
EPO, Office Action for EP Application No. 17932204.5, dated Jul. 19, 2021.
IPI, Office Action for IN Application No. 202017024827, dated Jul. 30, 2021.
CNIPA, First Office Action for CN Application No. 202010548641.6, dated Jul. 30, 2021.
CNIPA, Notice of Priority Review of Patent Application, CN Application No. 202010548641.6, dated Jul. 14, 2021.
Ericsson, "On Bandwidth Parts and Multiple SSBs," 3GPP TSG-RAN WG2 #99bis, Tdoc R2-1711822, Oct. 2017, 6 pages.
Huawei et al., "Control plane impacts for Bandwidth Parts," 3GPP TSG-RAN WG2 Meeting #99bis, R2-1710457, Oct. 2017, 5 pages.
LG Electronics Inc., "Impacts of BWP for UE in IDLE and Inactive," 3GPP TSG-RAN WG2 #99bis, R2-1711387, Oct. 2017, 4 pages.
Samsung, "Signaling to support bandwidth part," 3GPP TSG-RAN WG2 NR #99bis Meeting, R2-1711188, Oct. 2017, 7 pages.
ETSI MCC, "Report of 3GPP TSG RAN2#98 meeting, Hangzhou, China," 3GPP TSG-RAN WG2 meeting #99, R2-1707601, Aug. 2017, 294 pages.
EPO, Extended European Search Report for EP Application No. 17932204.5, dated Oct. 8, 2020.
Huawei et al., "On initial active bandwidth part," 3GPP TSG RAN WG1 Meeting 90bis, R1-1717057, Oct. 2017, 4 pages.
Qualcomm Incorporated, "Organization of NR System Information," 3GPP TSG-RAN WG2 Meeting #99, R2-1707874, Aug. 2017, 2 pages.
JPO, Office Action for JP Application No. 2020-526619, dated Sep. 7, 2021.
CNIPA, Second Office Action for CN Application No. 202010548641.6, dated Oct. 13, 2021.
CNIPA, Third Office Action for CN Application No. 202010548641.6, dated Dec. 15, 2021.
CNIPA, Fourth Office Action for CN Application No. 202010548641.6, dated Feb. 7, 2022.
TIPO, First Office Action for TW Application No. 107140359, dated Nov. 30, 2021.
IPOS, Office Action for SG Application No. 11202004487V, dated Jan. 26, 2022.

* cited by examiner

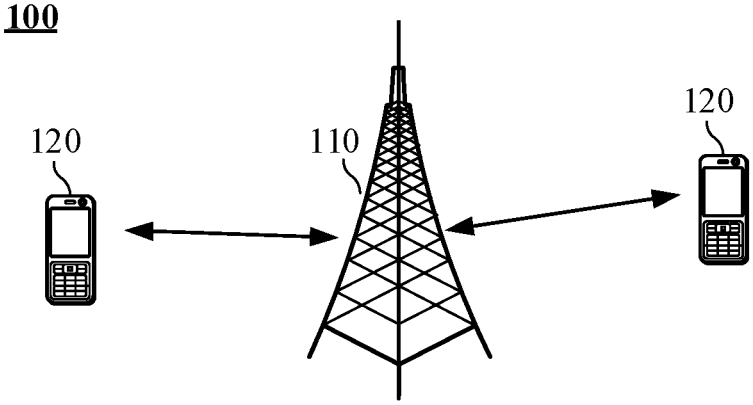

| The terminal device receives a system information block SIB1 broadcasted by a network device, where the SIB1 includes frequency point information of an uplink carrier | S210 |

| The terminal device determines, according to the frequency point information of the uplink carrier, an uplink BWP associated with a downlink bandwidth part BWP for broadcasting the SIB1 | S220 |

| The terminal device receives radio resource control RRC signaling transmitted by a network device, where the RRC signaling includes information on at least one uplink bandwidth part BWP and at least one downlink BWP | S310 |

| The terminal device receives a correspondence transmitted by the network device, where the correspondence is an association between the at least one uplink BWP and the at least one downlink BWP | S320 |

The network device broadcasts a system information block SIB1, where the SIB1 includes frequency point information of an uplink carrier, and the frequency point information of the uplink carrier is used to determine an uplink BWP associated with a downlink bandwidth part BWP for broadcasting the SIB1  ~S410

The network device transmits radio resource control RRC signaling to the terminal device, where the RRC signaling includes information on at least one uplink bandwidth part BWP and at least one downlink BWP  ~S510

The network device transmits a correspondence to the terminal device, where the correspondence is an association between the at least one BWP and the at least one downlink BWP  ~S520

FIG. 5

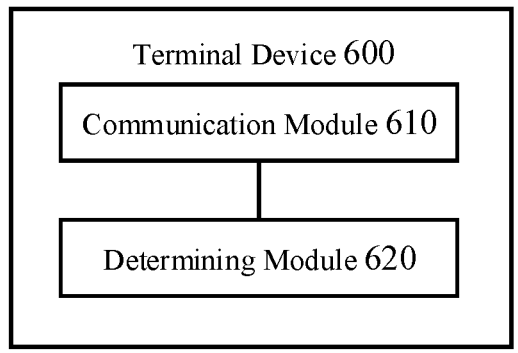

FIG. 6

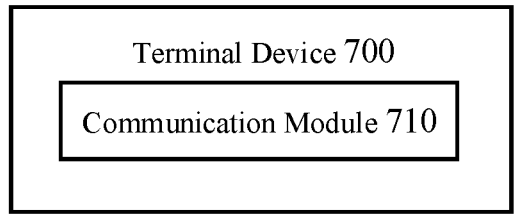

FIG. 7

DATA TRANSMISSION METHOD, TERMINAL DEVICE AND NETWORK DEVICE

CROSS-REFERENCE TO RELATED APPLICATION

This application is a U.S. national phase application of International Application No. PCT/CN2017/111160, filed Nov. 15, 2017, the entire disclosure of which is incorporated herein by reference.

TECHNICAL FIELD

Embodiments of the present application relate to the field of communications, and more specifically, to a method for transmitting data, a terminal device, and a network device.

BACKGROUND

In the discussion about the 5G New Radio (NR) system, it was determined that the system bandwidth supported by the NR system is much larger than the system bandwidth of the Long Term Evolution (LTE) system. For example, the low-frequency bandwidth can reach to 100 MHz and the high-frequency bandwidth can reach to 400 MHz. However, for some terminal devices, due to their limited capabilities, they cannot support the full system bandwidth. Therefore, the concept of Bandwidth Part (BWP) is introduced in the NR system. The bandwidth of each BWP is less than or equal to the largest system bandwidth.

A network device may configure one or more uplink BWPs for the terminal device, and may also configure one or more downlink BWPs for the terminal device.

SUMMARY

Embodiments of the present application provide a method for transmitting data, a terminal device, and a network device.

In a first aspect, there is provided a method for transmitting data, including:

receiving, by a terminal device, a system information block SIB1 broadcasted by a network device, wherein the SIB1 includes frequency point information of an uplink carrier; and determining, by the terminal device, according to the frequency point information of the uplink carrier, an uplink BWP associated with a downlink bandwidth part BWP for broadcasting the SIB1.

In view of the first aspect, in some implementations of the first aspect, the determining, by the terminal device, according to the frequency point information of the uplink carrier, the uplink BWP associated with the downlink bandwidth part BWP for broadcasting the SIB1 includes:

determining, by the terminal device, the frequency point information of the uplink carrier as the uplink BWP associated with the downlink BWP for broadcasting the SIB1.

In view of the first aspect, in some implementations of the first aspect, the network device simultaneously activates or deactivates associated uplink BWP and downlink BWP.

In a second aspect, there is provided a method for transmitting data, including:

receiving, by a terminal device, radio resource control RRC signaling transmitted by a network device, wherein the RRC signaling includes information on at least one uplink bandwidth part BWP and at least one downlink BWP; and receiving, by the terminal device, a correspondence transmitted by the network device, wherein the correspondence is an association between the at least one uplink BWP and the at least one downlink BWP.

Optionally, the correspondence may be one uplink BWP to one downlink BWP, or multiple uplink BWPs to one downlink BWP, or one uplink BWP to multiple downlink BWPs.

In view of the second aspect, in some implementations of the second aspect, the receiving, by the terminal device, the correspondence configured by the network device includes:

receiving, by the terminal device, downlink control information DCI transmitted by the network device, wherein the DCI includes the correspondence.

In view of the second aspect, in some implementations of the second aspect, the receiving, by the terminal device, the correspondence configured by the network device includes:

receiving, by the terminal device, RRC signaling transmitted by the network device, wherein the RRC signaling includes the correspondence.

In view of the second aspect, in some implementations of the second aspect, the method further includes:

receiving, by the terminal device, the common configuration information of the uplink BWP transmitted by the network device.

In view of the second aspect, in some implementations of the second aspect, the receiving, by the terminal device, the common configuration information of the uplink BWP transmitted by the network device includes:

receiving, by the terminal device, a system information block SIB broadcasted by the network device, wherein the SIB includes the common configuration information of the uplink BWP.

In view of the second aspect, in some implementations of the second aspect, the receiving, by the terminal device, the common configuration information of the uplink BWP transmitted by the network device includes:

receiving, by the terminal device, RRC signaling transmitted by the network device, wherein the RRC signaling includes the common configuration information of the uplink BWP.

In a third aspect, there is provided a method for transmitting data, including:

broadcasting, by a network device, a system information block SIB1, wherein the SIB1 includes frequency point information of an uplink carrier, and the frequency point information of the uplink carrier is used to determine an uplink BWP associated with a downlink bandwidth part BWP for broadcasting the SIB1.

In view of the third aspect, in some implementations of the third aspect, the method further includes:

activating or deactivating, by the network device, associated uplink BWP and downlink BWP simultaneously.

In a fourth aspect, there is provided a method for transmitting data, including:

transmitting, by a network device, radio resource control RRC signaling to a terminal device, wherein the RRC signaling includes information on at least one uplink bandwidth part BWP and at least one downlink BWP; and transmitting, by the network device, a correspondence to the terminal device, wherein the correspondence is an association between the at least one BWP and the at least one downlink BWP.

In view of the fourth aspect, in some implementations of the fourth aspect, the transmitting, by the network device, the correspondence to the terminal device includes:

transmitting, by the network device, downlink control information DCI to the terminal device, wherein the DCI includes the correspondence.

In view of the fourth aspect, in some implementations of the fourth aspect, the transmitting, by the network device, the correspondence to the terminal device includes:

transmitting, by the network device, RRC signaling to the terminal device, wherein the RRC signaling includes the correspondence.

In view of the fourth aspect, in some implementations of the fourth aspect, the method further includes:

transmitting, by the network device, the common configuration information of the uplink BWP to the terminal device.

In view of the fourth aspect, in some implementations of the fourth aspect, the transmitting, by the network device, the common configuration information of the uplink BWP to the terminal device includes:

broadcasting, by the network device, a system information block SIB, wherein the SIB includes the common configuration information of the uplink BWP.

In view of the fourth aspect, in some implementations of the fourth aspect, the transmitting, by the network device, the common configuration information of the uplink BWP to the terminal device includes:

transmitting, by the network device, RRC signaling to the terminal device, wherein the RRC signaling includes the common configuration information of the uplink BWP.

In a fifth aspect, there is provided a terminal device, to perform the method in the first aspect or in any of the implementations of the first aspect, or to perform the method in the second aspect or in any of the implementations of the second aspect. Specifically, the terminal device includes units for performing the method in the first aspect or in any of the implementations of the first aspect, or the terminal device includes units for performing the method in the second aspect or in any of the implementations of the second aspect.

In a sixth aspect, there is provided a terminal device. The device includes: a memory, a processor, an input interface, and an output interface. The memory, the processor, the input interface and the output interface are connected through a bus system. The memory is configured to store instructions, and the processor is configured to execute the instructions stored in the memory, and configured to perform the method in the first aspect or in any of the implementations of the first aspect, or to perform the method in the second aspect or in any of the implementations of the second aspect.

In a seventh aspect, there is provided a network device, to perform the method in the third aspect or in any of the implementations of the third aspect, or to perform the method in the fourth aspect or in any of the implementations of the fourth aspect. Specifically, the network device includes units for performing the method in the third aspect or in any of the implementations of the third aspect, or the network device includes units for performing the method in the fourth aspect or in any of the implementations of the fourth aspect.

In an eighth aspect, there is provided a network device. The device includes: a memory, a processor, an input interface, and an output interface. The memory, the processor, the input interface and the output interface are connected through a bus system. The memory is configured to store instructions, and the processor is configured to execute the instructions stored in the memory, and configured to perform the method in the third aspect or in any of the implementations of the third aspect, or to perform the method in the fourth aspect or in any of the implementations of the fourth aspect.

In a ninth aspect, there is provided a computer storage medium for storing computer software instructions configured to perform the method in any one of the first to the fourth aspects or in any of the implementations of any one of the first to the fourth aspects and includes computer software instructions designed to perform the above aspect.

In a tenth aspect, there is provided a computer program product including instructions, which when being executed on a computer, cause the computer to perform the method in any one of the first to the fourth aspects or in any of the implementations of any one of the first to the fourth aspects.

BRIEF DESCRIPTION OF THE DRAWINGS

FIG. 1 is a schematic diagram of an application scenario according to an embodiment of the present application.

FIG. 2 shows a schematic flowchart of a method for transmitting data according to an embodiment of the present application.

FIG. 3 shows a schematic flowchart of a method for transmitting data according to another embodiment of the present application.

FIG. 4 shows a schematic flowchart of a method for transmitting data according to another embodiment of the present application.

FIG. 5 shows a schematic flowchart of a method for transmitting data according to another embodiment of the present application.

FIG. 6 shows a schematic block diagram of a terminal device according to an embodiment of the present application.

FIG. 7 shows a schematic block diagram of a terminal device according to another embodiment of the present application.

DETAILED DESCRIPTION

Figure 8:
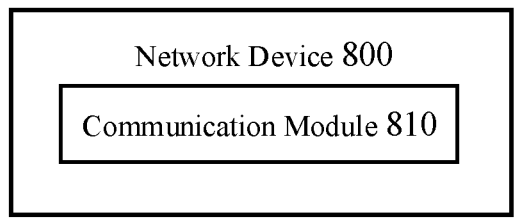
FIG. 8 shows a schematic block diagram of a network device according to an embodiment of the present application.

The technical solutions in the embodiments of the present application will be described below with reference to the drawings.

The technical solutions in the embodiments of the present application can be applied to various communication systems, such as: a Long Term Evolution (LTE) system, an LTE Frequency Division Duplex (FDD) system, and LTE Time Division Duplex (TDD) or a future 5G system.

FIG. 1 shows a wireless communication system 100 applied in an embodiment of the present application. The wireless communication system 100 may include a network device 110. The network device 110 may be a device that communicates with a terminal device. The network device 110 may provide communication coverage for a specific geographic area, and may communicate with a terminal device (such as a UE) located within the coverage area. Optionally, the network device 110 may be an evolved base station (Evolutional Node B, eNB, or eNodeB) in the LTE system, or the network device may be a relay station, an access point, a vehicle-mounted device, a wearable device, or a network-side device in a future 5G network or a network device in a future evolved Public Land Mobile Network (PLMN).

The wireless communication system 100 further includes at least one terminal device 120 located within a coverage area of the network device 110. The terminal device 120 may be mobile or fixed. Optionally, the terminal device 120 may refer to an access terminal, user equipment (UE), a user unit, a user station, a mobile station, a mobile site, a remote station, a remote terminal, a mobile device, a user terminal, a terminal, and wireless communication device, a user agent, or a user device. The access terminal can be a cell phone, a cordless phone, a Session Initiation Protocol (SIP) phone, a Wireless Local Loop (WLL) station, a Personal Digital Assistant (PDA), and a handheld device having a wireless communication function, a computing device, or other processing device connected to a wireless modem, a vehicle-mounted device, a wearable device, a terminal device in a future 5G network or a terminal device in a future evolved PLMN.

FIG. 2 is a schematic flowchart of a method 200 for transmitting data according to an embodiment of the present application. The method 200 may be performed by the terminal device in the communication system 100 shown in FIG. 1. As shown in FIG. 2, the method 200 can include the following steps.

At S210, the terminal device receives a system information block SIB1 broadcasted by a network device, wherein the SIB1 includes frequency point information of an uplink carrier.

At S220, the terminal device determines, according to the frequency point information of the uplink carrier, an uplink BWP associated with a downlink bandwidth part BWP for broadcasting the SIB1.

Specifically, the network device may include frequency point information of an uplink carrier in a broadcasted System Information Block (SIB1), and the frequency point information of the uplink carrier may correspond to one or more uplink BWPs. The frequency point of a downlink carrier for broadcasting the SIB1 may correspond to a corresponding downlink BWP, and the terminal device may determine the uplink BWP associated with the downlink BWP corresponding to the downlink carrier for broadcasting the SIB1 according to the frequency point information of the uplink carrier included in the SIB1. For example, the terminal device may directly determine that the uplink BWP corresponding to the frequency point information of the uplink carrier is the uplink BWP associated with the downlink BWP corresponding to the downlink carrier for broadcasting the SIB1.

For example, if the frequency point information of the uplink carrier corresponds to a first uplink BWP, and the downlink BWP corresponding to the downlink carrier for broadcasting the SIB1 is the first downlink BWP, the terminal device may directly determine that the uplink BWP associated with the first downlink BWP is the first uplink BWP. That is, the first uplink BWP and the second downlink BWP are BWPs in an association. It should be understood that the first uplink BWP may include at least one uplink BWP, and the first downlink BWP may include at least one downlink BWP. After the terminal device determines the association between the uplink BWP and the downlink BWP, the terminal device can receive common configuration information of the first uplink BWP on the first downlink BWP, and then perform uplink transmission according to the common configuration information.

It should be understood that, in the embodiment of the present application, the terminal device may also obtain the frequency point information of the uplink carrier according to other signaling (for example, RRC signaling or physical layer signaling) transmitted by the network device, and may further determine, according to the frequency point information of the uplink carrier, the uplink BWP associated with the downlink BWP corresponding to the downlink carrier for transmitting the signaling.

Optionally, in the embodiment of the present application, common configuration information of the uplink BWP may be configured by the network device through the SIB, or may also be configured through radio resource control (Radio Resource Control, RRC) signaling, which is not limited in the embodiment of the present application.

Optionally, in the embodiment of the present application, the network device activates or deactivates associated uplink BWP and downlink BWP simultaneously.

For example, if the first uplink BWP and the first downlink BWP are associated BWPs, the network device may activate the first downlink BWP simultaneously when the network device activates the first uplink BWP, or deactivate the first downlink BWP simultaneously when the network device deactivates the first uplink BWP. That is, the states of the associated uplink BWP and downlink BWP are the same, and they are both activated or deactivated. This is advantageous to avoid communication abnormality caused when the uplink BWP is in an activated state, while the associated downlink BWP is in a deactivated state, or the downlink BWP is in the activated state, while the associated uplink BWP is in the deactivated state.

Therefore, in the method for transmitting data in the embodiment of the present application, the terminal device can obtain frequency point information of the uplink carrier by receiving SIB1 broadcasted by the network device, and can further determine, according to the frequency point information of the uplink carrier, the uplink BWP associated with the BWP corresponding to the downlink carrier for broadcasting the SIB1. Thus, the terminal device can obtain the common configuration information of the uplink BWP on the downlink carrier corresponding to the downlink BWP according to the association, and then perform uplink transmission according to the common configuration information of the uplink BWP.

FIG. 3 is a method for transmitting data according to another embodiment of the present application. The method 300 may be performed by the terminal device in the communication system 100 shown in FIG. 1. As shown in FIG. 3, the method 300 may include the following steps.

At S310, the terminal device receives radio resource control RRC signaling transmitted by a network device, wherein the RRC signaling includes information on at least one uplink bandwidth part BWP and at least one downlink BWP.

At S320, the terminal device receives a correspondence transmitted by the network device, wherein the correspondence is an association between the at least one uplink BWP and the at least one downlink BWP.

Specifically, the network device may configure information of at least one uplink BWP and at least one downlink BWP through semi-static signaling such as RRC signaling. For example, the information of the at least one uplink BWP and at least one downlink BWP may be in a form of a table.

Then, the association between the at least one uplink BWP and the at least one downlink BWP may be configured through dynamic signaling (for example, Downlink Control Information (DCI)) or semi-static signaling (for example, RRC signaling), so that the terminal device can learn about the association between the uplink BWP and the downlink BWP according to the correspondence, in turn can obtain common configuration information of the associated uplink BWP on the downlink carrier corresponding to the downlink BWP, and then can perform uplink transmission according to the common configuration information of the uplink BWP.

It should be understood that since the information of at least one uplink bandwidth part BWP and at least one downlink BWP is configured through semi-static signaling, S310 may be performed only once before the network device changes the information of the uplink BWP and the downlink BWP. If the correspondence is configured through dynamic signaling, the S320 may be performed for one or more times, that is, the network device may dynamically configure the correspondence through dynamic signaling. Alternatively, if the correspondence is configured through semi-static signaling, before the network device changes the association between the uplink BWP and the downlink BWP, S320 may be performed only once.

It should be understood that the information of the at least one uplink BWP and the at least one downlink BWP may be identifier information of the at least one uplink BWP and the at least one downlink BWP, and the correspondence may be a correspondence between the identifier of the uplink BWP and the identifier of the downlink BWP. The correspondence may optionally be one uplink BWP to one downlink BWP, or multiple uplink BWPs to one downlink BWP, or one uplink BWP to multiple downlink BWPs.

Optionally, as an embodiment, S320 may include:

the terminal device receiving downlink control information DCI transmitted by the network device, wherein the DCI includes the correspondence.

That is, the terminal device may dynamically configure the association between the at least one BWP and the at least one downlink BWP through dynamic signaling (for example, DCI).

Optionally, as another embodiment, S320 may include:

the terminal device receiving RRC signaling transmitted by the network device, wherein the RRC signaling includes the correspondence.

That is, the terminal device may configure the association between the at least one BWP and the at least one downlink BWP through semi-static signaling. The embodiment of the present application does not specifically limit the configuration manner of the correspondence.

Optionally, in some embodiments, the method 300 may further include:

the terminal device receiving the common configuration information of the uplink BWP transmitted by the network device.

For example, the network device may configure the common configuration information of the uplink BWP by broadcasting SIB or RRC signaling.

That is, the network device may include the common configuration information of the uplink BWP in the broadcasted SIB, or may also include the common configuration information of the uplink BWP in the RRC signaling to notify the terminal device of the common configuration information of the uplink BWP.

Therefore, in the method for transmitting data according to the embodiment of the present application, the terminal device may learn about information of the at least one BWP and the at least one downlink BWP through semi-static signaling, and then may learn about the association between the at least one BWP and the at least one downlink BWP through dynamic signaling or semi-static signaling, so that the terminal device can obtain the common configuration information of the uplink BWP on the downlink carrier corresponding to the downlink BWP according to the association, and further perform uplink transmission according to the common configuration information of the uplink BWP.

The method for transmitting data according to the embodiment of the present application has been described from the perspective of a terminal device with reference to FIG. 2 and FIG. 3 above, and below the method for transmitting data according to the embodiment of the present application will be described from the perspective of a network device with reference to FIG. 4 and FIG. 5. It should be understood that the description on the network device side and the description on the terminal device side correspond to each other. Similar descriptions can be referred to above, which will not be repeated herein for brevity.

FIG. 4 is a schematic flowchart of a method for transmitting data according to another embodiment of the present application. The method 400 may be performed by a network device in the communication system 100 shown in FIG. 1. As shown in FIG. 4, the method 400 may include the following steps.

At S410, the network device broadcasts a system information block SIB1, wherein the SIB1 includes frequency point information of an uplink carrier, and the frequency point information of the uplink carrier is used to determine an uplink BWP associated with a downlink bandwidth part BWP for broadcasting the SIB1.

Optionally, the method 400 further includes:

the network device activating or deactivating associated uplink BWP and downlink BWP simultaneously.

FIG. 5 is a schematic flowchart of a method for transmitting data according to another embodiment of the present application. The method 500 may be performed by the network device in the communication system 100 shown in FIG. 1. As shown in FIG. 5, the method 500 may include the following steps.

At S510, the network device transmits radio resource control RRC signaling to a terminal device, wherein the RRC signaling includes information on at least one uplink bandwidth part BWP and at least one downlink BWP.

At S520, the network device transmits a correspondence to the terminal device, wherein the correspondence is an association between the at least one BWP and the at least one downlink BWP.

Optionally, in some embodiments, S520 may specifically include:

the network device transmitting downlink control information DCI to the terminal device, wherein the DCI includes the correspondence.

Optionally, in some embodiments, S520 may specifically include:

the network device transmitting RRC signaling to the terminal device, wherein the RRC signaling includes the correspondence.

Optionally, in some embodiments, the method 500 further includes:

the network device transmitting common configuration information of the uplink BWP to the terminal device.

Optionally, in some embodiments, the network device transmitting the common configuration information of the uplink BWP to the terminal device includes:

the network device broadcasting a system information block SIB, wherein the SIB includes the common configuration information of the uplink BWP.

Optionally, in some embodiments, the network device transmitting the common configuration information of the uplink BWP to the terminal device includes:

the network device transmitting RRC signaling to the terminal device, wherein the RRC signaling includes the common configuration information of the uplink BWP.

FIG. 6 is a schematic block diagram of a terminal device according to an embodiment of the present application. The terminal device 600 shown in FIG. 6 includes:

a communication module 610 configured to receive a system information block SIB1 broadcasted by a network device, wherein the SIB1 includes frequency point information of an uplink carrier; and a determining module 620 configured to determine an uplink BWP associated with a downlink bandwidth part BWP for broadcasting the SIB1 according to the frequency point information of the uplink carrier.

Optionally, in some embodiments, the determining module 620 is specifically configured to:

determine the uplink BWP corresponding to the frequency point information of the uplink carrier as the uplink BWP associated with the downlink BWP for broadcasting the SIB1.

Optionally, in some embodiments, the network device simultaneously activates or deactivates associated uplink BWP and downlink BWP.

Specifically, the terminal device 600 may correspond to (for example, be configured on or be) the terminal device described in the above method 200, and each module or unit in the terminal device 600 is respectively configured to perform each action or step performed by the terminal device in the above method 200. Here, in order to avoid redundant description, detailed descriptions are omitted.

FIG. 7 is a schematic block diagram of a terminal device according to an embodiment of the present application. The terminal device 700 shown in FIG. 7 includes:

a communication module 710 receives radio resource control RRC signaling transmitted by a network device, wherein the RRC signaling includes information on at least one uplink bandwidth part BWP and at least one downlink BWP, and receives a correspondence transmitted by the network device, wherein the correspondence is an association between the at least one uplink BWP and the at least one downlink BWP.

Optionally, in some embodiments, the communication module 710 is specifically configured to:

receive downlink control information DCI transmitted by the network device, wherein the DCI includes the correspondence.

Optionally, in some embodiments, the communication module 710 is specifically configured to:

receive RRC signaling transmitted by the network device, wherein the RRC signaling includes the correspondence.

Optionally, in some embodiments, the communication module 710 is further configured to:

receive common configuration information of the uplink BWP transmitted by the network device.

Optionally, in some embodiments, the communication module 710 is specifically configured to:

receive a system information block SIB broadcasted by the network device, wherein the SIB includes the common configuration information of the uplink BWP.

Optionally, in some embodiments, the communication module 710 is specifically configured to:

receive RRC signaling transmitted by the network device, wherein the RRC signaling includes the common configuration information of the uplink BWP.

Specifically, the terminal device 700 may correspond to (for example, be configured on or be) the terminal device described in the above method 300, and each module or unit in the terminal device 700 is respectively configured to perform each action or step performed by the terminal device in the above method 300. Here, in order to avoid redundant description, detailed descriptions are omitted.

FIG. 8 is a schematic block diagram of a network device according to an embodiment of the present application. The network device 800 shown in FIG. 8 includes:

a communication module 810 configured to broadcast a system information block SIB1, wherein the SIB1 includes frequency point information of an uplink carrier, and the frequency point information of the uplink carrier is used to determine an uplink BWP associated with a downlink bandwidth part BWP for broadcasting the SIB1.

Optionally, in some embodiments, the network device 800 further includes:

a control module configured to simultaneously activate or deactivate associated uplink BWP and downlink BWP.

Specifically, the network device 800 may correspond to (for example, be configured on or be) the network device described in the above method 400, and each module or unit in the network device 800 is respectively configured to perform each action or step performed by the network device in the above method 400. Here, in order to avoid redundant description, detailed descriptions are omitted.

Figure 9:
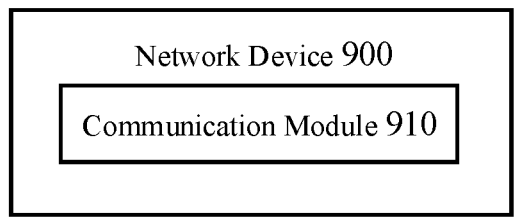
FIG. 9 shows a schematic block diagram of a network device according to another embodiment of the present application.

FIG. 9 is a schematic block diagram of a network device according to an embodiment of the present application. The network device 900 shown in FIG. 9 includes:

a communication module 910 configured to transmit radio resource control RRC signaling to the terminal device, wherein the RRC signaling includes information on at least one uplink bandwidth part BWP and at least one downlink BWP; and transmit a correspondence to the terminal device, wherein the correspondence is an association between the at least one BWP and the at least one downlink BWP.

Optionally, in some embodiments, the communication module 910 is specifically configured to:

transmit downlink control information DCI to the terminal device, wherein the DCI includes the correspondence.

Optionally, in some embodiments, the communication module 910 is specifically configured to:

transmit RRC signaling to the terminal device, wherein the RRC signaling includes the correspondence.

Optionally, in some embodiments, the communication module 910 is further configured to:

transmit common configuration information of the uplink BWP to the terminal device.

Optionally, in some embodiments, the communication module 910 is specifically configured to:

broadcast a system information block SIB, wherein the SIB includes the common configuration information of the uplink BWP.

Optionally, in some embodiments, the communication module 910 is specifically configured to:

transmit RRC signaling to the terminal device, wherein the RRC signaling includes the common configuration information of the uplink BWP.

Specifically, the network device 900 may correspond to (for example, may be configured on or be) the network device described in the above method 500, and each module or unit in the network device 900 is respectively configured to perform each action or step performed by the network device in the above method 500. Here, in order to avoid redundant description, detailed descriptions are omitted.

Figure 10:
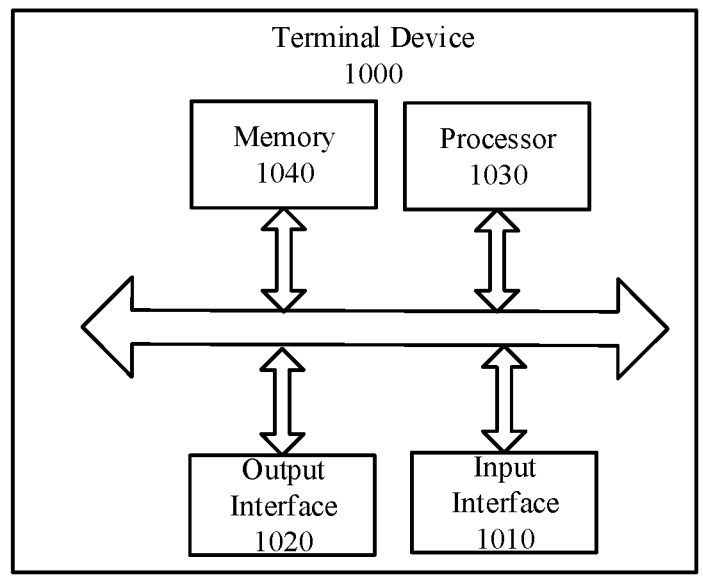
FIG. 10 shows a schematic block diagram of a terminal device according to still another embodiment of the present application.

As shown in FIG. 10, an embodiment of the present application further provides a terminal device 1000. The terminal device 1000 may be the terminal device 600 in FIG. 6 or the terminal device 700 in FIG. 7, which can be used to execute the corresponding part of the terminal device in the method 200 shown in FIG. 2 or the method 300 shown in FIG. 3. The terminal device 1000 includes: an input interface 1010, an output interface 1020, a processor 1030, and a memory 1040. The input interface 1010, the output interface 1020, the processor 1030, and the memory 1040 may be connected through a bus system. The memory 1040 is configured to store a program, an instruction, or a code. The processor 1030 is configured to execute the program, the instruction, or the code in the memory 1040 to control the input interface 1010 to receive signals, control the output interface 1020 to send signals, and complete operations in the above method embodiments.

It should be understood that, in the embodiment of the present application, the processor 1030 may be a Central Processing Unit (CPU), and the processor 1030 may also be another general-purpose processor or digital signal processor (DSP), application specific integrated circuit (ASIC), field programmable gate array (FPGA) or other programmable logic devices, discrete gate or transistor logic devices, discrete hardware components, etc. A general-purpose processor may be a microprocessor, or the processor may be any conventional processor or the like.

The memory 1040 may include a read-only memory and a random access memory, and provide instructions and data to the processor 1030. A part of the memory 1040 may further include a non-volatile random access memory. For example, the memory 1040 may also store information of a device type.

In the implementation process, each part of the above method may be completed by using hardware integrated logic circuits or instructions in the form of software in the processor 1030. The content of the method disclosed in connection with the embodiments of the present application may be directly embodied as being executed by a hardware processor, or may be executed and completed by using a combination of hardware and software modules in the processor. A software module may be located in a well-known storage medium such as a random access memory, a flash memory, a read-only memory, a programmable read-only memory, or an electrically erasable programmable memory, a register, and the like. The storage medium is located in the memory 1040, and the processor 1030 reads the information in the memory 1040 and completes the content of the above method in combination with its hardware. To avoid repetition, it will not be described in detail here.

In a specific embodiment, the determining module 620 included in the terminal device 600 in FIG. 6 may be implemented by the processor 1030 of FIG. 10, and the communication module 610 included in the terminal device 600 in FIG. 6 may be implemented with the input interface 1010 and the output interface 1020 of FIG. 10.

In another specific implementation, the communication module 710 included in the terminal device 700 in FIG. 7 may be implemented with the input interface 1010 and the output interface 1020 of FIG. 10.

Figure 11:
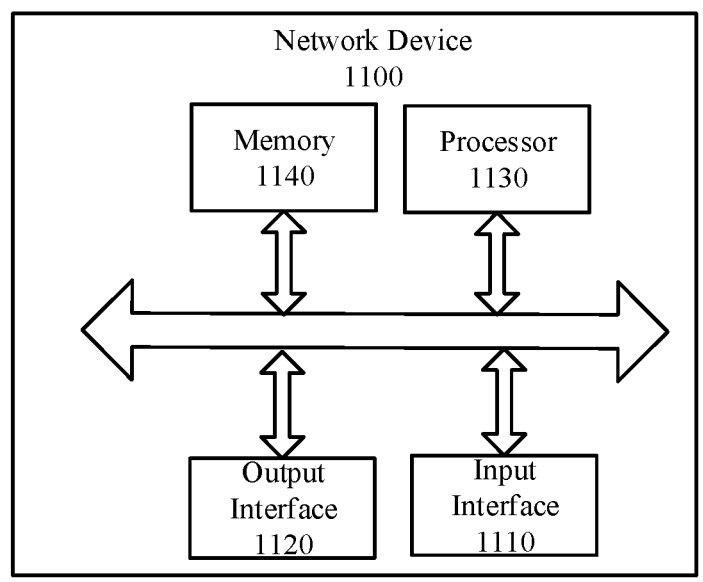
FIG. 11 shows a schematic block diagram of a network device according to still another embodiment of the present application.

As shown in FIG. 11, an embodiment of the present application further provides a network device 1100. The network device 1100 may be the network device 800 in FIG. 8 or the network device 900 in FIG. 9, which can be used to execute the method 400 shown in FIG. 4 or the corresponding part of the network device in the method 500 shown in FIG. 5. The network device 1100 includes: an input interface 1110, an output interface 1120, a processor 1130, and a memory 1140. The input interface 1110, the output interface 1120, the processor 1130, and the memory 1140 may be connected through a bus system. The memory 1140 is configured to store a program, an instruction, or a code. The processor 1130 is configured to execute the program, the instruction, or the code in the memory 1140 to control the input interface 1110 to receive signals, control the output interface 1120 to send signals, and complete operations in the above method embodiments.

It should be understood that, in the embodiment of the present application, the processor 1130 may be a Central Processing Unit (CPU), and the processor 1130 may also be another general-purpose processor or digital signal processor (DSP), application specific integrated circuit (ASIC), field programmable gate array (FPGA) or other programmable logic devices, discrete gate or transistor logic devices, discrete hardware components, etc. A general-purpose processor may be a microprocessor, or the processor may be any conventional processor or the like.

The memory 1140 may include a read-only memory and a random access memory, and provide instructions and data to the processor 1130. A part of the memory 1140 may further include a non-volatile random access memory. For example, the memory 1140 may also store information of a device type.

In the implementation process, each part of the above method may be completed by using a hardware integrated logic circuits or instructions in the form of software in the processor 1130. The content of the method disclosed in connection with the embodiments of the present application may be directly embodied as being executed by a hardware processor, or may be executed and completed by using a combination of hardware and software modules in the processor. A software module may be located in a well-known storage medium such as a random access memory, a flash memory, a read-only memory, a programmable read-only memory, or an electrically erasable programmable memory, a register, and the like. The storage medium is located in the memory 1140, and the processor 1130 reads the information in the memory 1140 and completes the content of the above method in combination with its hardware. To avoid repetition, it will not be described in detail here.

In a specific implementation, the communication module 810 included in the network device 800 in FIG. 8 may be implemented with the input interface 1110 and the output interface 1120 of FIG. 11, and the control module included in the network device 800 in FIG. 8 may be implemented with the processor 1130 of FIG. 11.

In another specific implementation, the communication module 910 included in the network device 900 in FIG. 9 may be implemented with the input interface 1110 and the output interface 1120 of FIG. 11.

An embodiment of the present application further provides a computer-readable storage medium, wherein the computer-readable storage medium stores one or more programs, the one or more programs include instructions, which when being executed by a portable electronic device including multiple application programs, can cause the portable electronic device to execute the methods in the embodiments shown in FIG. 2 to FIG. 5.

An embodiment of the present application further provides a computer program. The computer program includes instructions, which when the computer program is executed by a computer, can cause the computer to execute a corresponding process of the methods shown in FIG. 2 to FIG. 5.

It should be appreciated by those skilled in the art that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. A professional technician can use different methods to implement the described functions for each specific application, but such implementation should not be considered to be beyond the scope of this application.

Those skilled in the art can clearly understand that, for the convenience and brevity of description, the specific working processes of the systems, devices, and units described above can refer to the corresponding processes in the above method embodiments, which will not be repeated herein.

In the several embodiments provided in this application, it should be understood that the disclosed systems, devices, and methods can be implemented in other ways. For example, the device embodiments described above are only schematic. For example, the division of the unit is only a logical function division. In actual implementation, there may be another division manner. For example, multiple units or components may be combined or may be integrated into another system, or some features can be ignored or skipped. In addition, the displayed or discussed mutual coupling or direct coupling or communication connection may be indirect coupling or communication connection through some interfaces, devices or units, which may be electrical, mechanical or in other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of this embodiment.

In addition, each functional unit in each embodiment of the present application may be integrated into one processing unit, or each of the units may exist separately in physical, or two or more units may be integrated into one unit.

When the functions are implemented in the form of software functional units and sold or used as independent products, the functions can be stored in a computer-readable storage medium. Based on such an understanding, the technical solution of the present application is, in essence, or with a part that contributes to the existing technology or a part of the technical solution, may be embodied in the form of a software product, wherein the computer software product is stored in a storage medium, including a number of instructions to enable a computer device (which may be a personal computer, a server, or a network device, etc.) to perform all or part of the steps of the method described in the embodiments of the present application. The above storage media include: a U disk, a mobile hard disk, a read-only memory (ROM, Read-Only Memory), a random access memory (RAM, Random Access Memory), a magnetic disk, or an optical disk and other medium that can store program codes.

The above is only specific embodiments of the present application, but the protection scope of the present application is not limited thereto, and modifications or substitutions easily conceived by any person skilled in the art within the technical scope of the present application should be covered by the protection scope of the present application. Therefore, the protection scope of the present application shall be subject to the protection scope of the claims.

What is claimed is:

1. A method for transmitting data, comprising:
receiving, by a terminal device, radio resource control (RRC) signaling transmitted by a network device, wherein the RRC signaling comprises information on at least one uplink bandwidth part (BWP) and at least one downlink BWP;
wherein the RRC signaling indicates a correspondence between one uplink BWP and one downlink BWP, wherein when receiving the radio resource control RRC signaling transmitted by the network device, the correspondence indicated by the RRC signaling is simultaneously activating the at least one uplink BWP and the at least one downlink BWP.

2. A method for transmitting data, comprising:
transmitting, by a network device, radio resource control (RRC) signaling to a terminal device, wherein the RRC signaling comprises information on at least one uplink bandwidth part (BWP) and at least one downlink BWP:
wherein the RRC signaling indicates a correspondence between one uplink BWP and one downlink BWP, wherein when receiving the radio resource control RRC signaling transmitted by the network device, the correspondence indicated by the RRC signaling is simultaneously activating the at least one uplink BWP and the at least one downlink BWP.

3. A terminal device, comprising:
a memory storing instructions and a processor, the processor is configured to execute the instructions stored in the memory, and causes the terminal device to perform the method according to claim 1.

4. A network device, comprising:
a memory storing instructions and a processor, the processor is configured to execute the instructions stored in the memory, and causes the network device to perform the method according to claim 2.

* * * * *